(12) United States Patent
Langtind et al.

(10) Patent No.: US 11,790,479 B2
(45) Date of Patent: Oct. 17, 2023

(54) PRIMITIVE ASSEMBLY AND VERTEX SHADING OF VERTEX ATTRIBUTES IN GRAPHICS PROCESSING SYSTEMS

(71) Applicant: Arm Limited, Cambridge (GB)

(72) Inventors: Frank Klaeboe Langtind, Melhus (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/163,289

(22) Filed: Jan. 29, 2021

(65) Prior Publication Data
US 2022/0245751 A1    Aug. 4, 2022

(51) Int. Cl.
*G06T 1/20*    (2006.01)
*G06T 1/60*    (2006.01)
*G06T 11/20*   (2006.01)

(52) U.S. Cl.
CPC ............... *G06T 1/20* (2013.01); *G06T 1/60* (2013.01); *G06T 11/203* (2013.01)

(58) Field of Classification Search
None
See application file for complete search history.

(56) References Cited

U.S. PATENT DOCUMENTS

| | | | | |
|---|---|---|---|---|
| 7,468,726 B1 * | 12/2008 | Wloka | ............... | G06T 15/40 345/419 |
| 8,139,070 B1 * | 3/2012 | Ostiguy | ............... | G06T 1/20 345/506 |
| 2005/0200629 A1 * | 9/2005 | Morein | ............... | G06T 1/20 345/557 |
| 2008/0074430 A1 * | 3/2008 | Jiao | ............... | G06T 15/005 345/506 |
| 2008/0094408 A1 * | 4/2008 | Yin | ............... | G06T 15/005 345/581 |
| 2010/0302246 A1 * | 12/2010 | Jiao | ............... | G06T 15/40 345/506 |
| 2015/0287158 A1 * | 10/2015 | Cerny | ............... | G09G 5/14 345/553 |
| 2016/0110914 A1 * | 4/2016 | Cho | ............... | G06T 1/20 345/426 |
| 2017/0061678 A1 * | 3/2017 | Engh-Halstvedt | .... | G06T 15/005 |
| 2021/0209827 A1 * | 7/2021 | Bhiravabhatla | ........... | G06T 1/60 |

OTHER PUBLICATIONS

Engh-Halstvedt et al., "Graphics Processing Systems," U.S. Appl. No. 17/989,504, filed Nov. 17, 2022.

* cited by examiner

*Primary Examiner* — Patrick F Valdez
(74) *Attorney, Agent, or Firm* — Vierra Magen Marcus LLP

(57) ABSTRACT

When generating a graphics processing output, a sequence of one or more of primitives to be processed when generating the output is assembled from a set of vertex indices provided for the output based on primitive configuration information provided for the output, each assembled primitive of the sequence of assembled primitives comprising an identifier for the primitive and a set of one or more vertex indices for the primitive. One or more attributes for vertices of the assembled primitives are then shaded and fetched based on the vertex indices of the assembled primitives. The assembled primitives including their shaded fetched vertex attribute(s) are then provided to later stages of the graphics processing pipeline for processing.

17 Claims, 5 Drawing Sheets

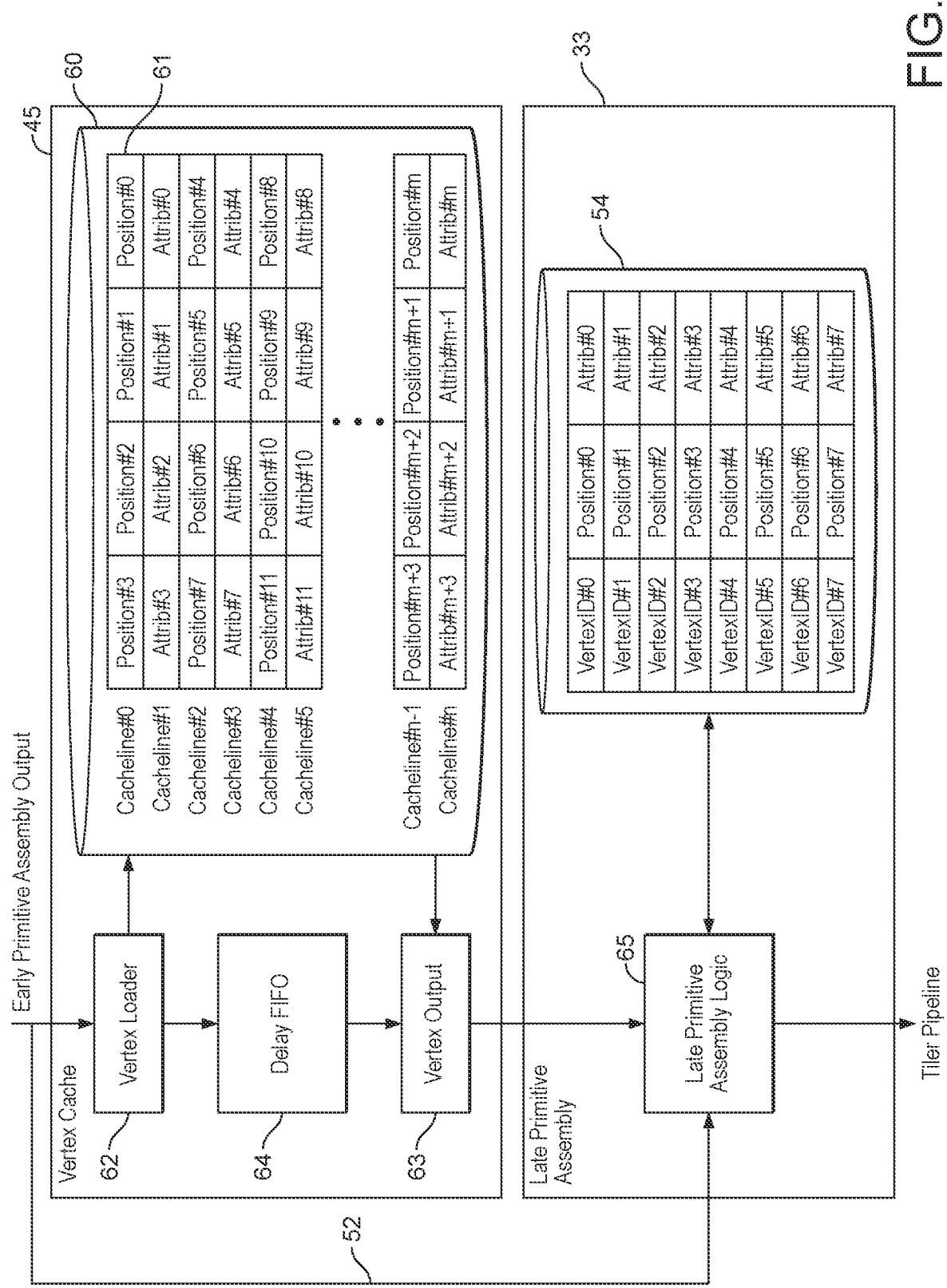

PRIMITIVE ASSEMBLY AND VERTEX SHADING OF VERTEX ATTRIBUTES IN GRAPHICS PROCESSING SYSTEMS

BACKGROUND

The technology described herein relates to graphics processing systems and in particular to methods of and apparatus for preparing primitives to be processed when rendering an output in a graphics processing system.

Computer graphics systems typically produce their output, such as frames for display, by processing so-called primitives, which are usually simple polygons such as triangles. Each primitive is normally defined by a set of vertices (e.g. three vertices in the case of triangular primitive).

Typically the set of vertices to be used for a given graphics processing output (e.g. frame for display) will be stored as a set of vertex data defining the vertices (e.g. the relevant attributes for each of the vertices).

While it would be possible simply to store the vertices to be used for each primitive to be generated in turn (such that, in effect, the set of vertices will correspondingly define the primitives to be processed), it is also known to define the primitives separately in terms of a set of indices that reference the vertices in the set of vertex data. This can then avoid, for example, the need to duplicate vertices in the set of vertex data, as a single vertex entry (vertex) in the set of vertices can be referred to multiple times by reusing the relevant index in the set of indices.

Accordingly, in the case of a typical graphics processing pipeline, the initially provided data for an output to be generated will, inter alia, comprise a set of vertices to be used and processed for generating the output, and a set (sequence) of indices referencing the set of vertices (to, in effect, define how the vertices will be used to form a set of primitives to be processed when generating the output).

Each vertex will have associated with it a set of data (such as position, colour, texture and other attributes) representing the vertex. This "vertex" data is then used when processing a primitive that includes the vertex in order to generate the desired output of the graphics processing system.

Once the vertices and sets of vertex indices for an output have been generated, they can be processed by a graphics processor to generate the desired graphics processing output (render target), such as a frame for display.

This will comprise, inter alia, "assembling" primitives using the vertices based on the set (sequence) of vertex indices, and then processing the so-assembled primitives.

The primitive processing may involve, for example, determining which sampling points of an array of sampling points associated with the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

There will then be an appropriate "primitive assembly" operation that "assembles" the primitives that are to be processed by the graphics processing pipeline from the provided indices and vertices, e.g. in accordance with a defined primitive type or types that are to be assembled using the provided indices and vertices.

The so-assembled primitives will then be processed, e.g. rasterised and rendered.

FIG. 1 illustrates this graphics processing sequence when generating an output.

As shown in FIG. 1, for an output to be generated, a set of scene data 11, including, inter alia, a set of vertices, and a set of indices defining primitives to be processed for the output and referencing the set of vertices, is provided.

The vertices then undergo appropriate vertex processing (shading) 12, e.g. to transform the positions for the vertices from "model" space to "screen" space.

There is then a primitive assembly stage 13 which takes the indices and the processed vertices and assembles primitives for processing using the indices and the vertices, e.g. in accordance with information indicating how the primitives are to be assembled using the indices (e.g. whether primitives in the form of simple triangles, triangle strips, or triangle fans, etc., should be generated for processing).

The assembled primitives are then rasterised 14 to generate appropriate graphics fragments for processing, and the fragments generated by the rasteriser are then processed appropriately (rendered) 15 to provide the final output, e.g. image 16.

The Applicants believe that there remains scope for improvements to the operation of such graphics processing.

BRIEF DESCRIPTION OF THE DRAWINGS

Embodiments of the technology described herein will now be described by way of example only and with reference to the accompanying drawings, in which:

FIG. 5 shows certain parts of the operation shown in FIG. 4 in more detail.

Like reference numerals are used for like features in the Figures, where appropriate.

DETAILED DESCRIPTION

Figure 1:
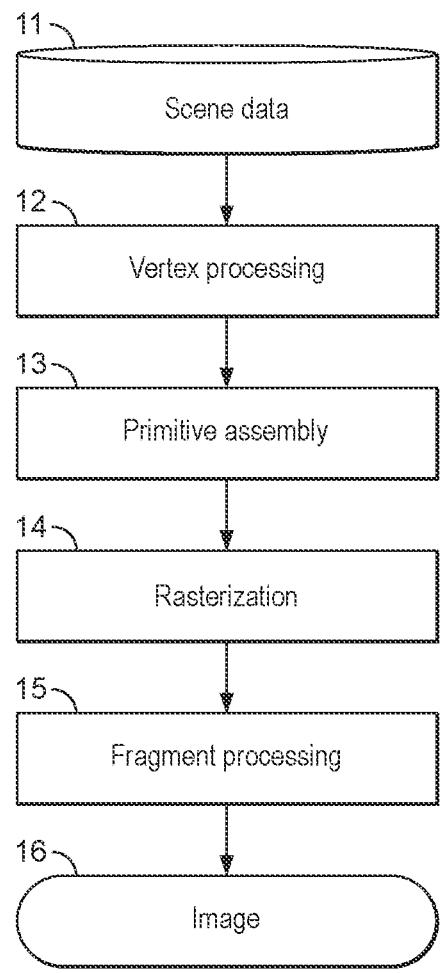
FIG. 1 shows an exemplary sequence of graphics processing.

A first embodiment of the technology described herein comprises a method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

assembling a sequence of one or more of primitives to be processed when generating the output from the set of vertex indices provided for the output based on the primitive configuration information provided for the output, each assembled primitive of the sequence of assembled primitives comprising an identifier for the primitive and a set of one or more vertex indices for the primitive;

fetching one or more attributes for vertices of the assembled primitives based on vertex indices of the assembled primitives, the fetching one or more attributes for vertices of the assembled primitives based on vertex indices of the assembled primitives including performing vertex attribute processing for one or more of the attributes being fetched; and providing the assembled primitives including their fetched vertex attribute(s) to later stages of the graphics processing pipeline that is being executed by the graphics processor for processing.

A second embodiment of the technology described herein comprises a graphics processor operable to execute a graphics processing pipeline to generate an output; the graphics processor comprising:

a primitive assembly circuit configured to generate a sequence of one or more of primitives to be processed when generating an output from a set of vertex indices provided for the output, the set of vertex indices referencing vertices in a set of vertices provided for the output, each vertex having associated with it a set of one or more vertex attributes, based on primitive configuration information provided for the output, the primitive configuration information indicating how the vertex indices are to be assembled into primitives for processing when generating the output, each assembled primitive of the sequence of assembled primitives comprising an identifier for the primitive and a set of one or more vertex indices for the primitive;

a vertex fetching circuit configured to fetch one or more attributes for vertices of the assembled primitives based on vertex indices of the assembled primitives, wherein the vertex fetching circuit is configured to trigger performing vertex attribute processing for one or more of the attributes being fetched; and a processing circuit configured to provide the assembled primitives including their fetched vertex attribute(s) to later stages of the graphics processing pipeline that the graphics processor executes for processing.

The technology described herein relates to graphics processors and graphics processing in which graphics primitives for processing are assembled from, inter alia, a set of vertex indices defined for an output to be generated.

However, in the technology described herein, and in contrast to conventional graphics processing pipelines as illustrated in FIG. 1 and discussed above, for example, the vertex attributes for the primitives to be processed are fetched (and where necessary processed (shaded)) after the primitives have been assembled (and based on the vertex indices for the assembled primitives).

In an embodiment, and as will be discussed further below, any vertex processing (vertex shading) that is required before the primitives can be processed is performed after the primitives have been assembled (and, in an embodiment, in response to (attempted) fetching of vertex attributes for the assembled primitives). (In other words, the primitives that are to be processed are assembled from the provided vertex indices (based on appropriate primitive configuration information, such as an indication of the "type" of primitives that are to be assembled), before any processing of the vertices (the vertex attributes), such as transforming the attributes to screen space, is performed.)

The Applicants have recognised that this arrangement of the technology described herein can provide a number of advantages over conventional systems in which vertex (attribute) processing is performed before the primitives are assembled.

For example, the Applicants have recognised that there can be vertices that are provided and defined for an output that may not in fact be used for any primitive that is to be processed when generating the output. In particular, there may be vertices that don't end up in a primitive to be processed, for example because they are only (ever) part of an "incomplete" primitive (i.e. a primitive having fewer than the required number of vertices), and/or a "degenerate" primitive (e.g. a primitive having zero area and/or two indices the same).

By only triggering the vertex attribute fetching/processing after the primitives have been assembled, the technology described herein can avoid performing vertex attribute fetching/processing for vertices that will not in fact be used for "complete" primitives (and so will not in fact need to be processed for the output in question).

This is in contrast to systems which perform vertex processing before the primitives are assembled, as in that case the vertices will be fetched and processed irrespective of whether they are needed or not, as it will not be known at that stage whether and which vertices are used in "complete" primitives or not.

Performing the primitive assembly operation before vertex attribute fetching/processing has taken place also avoids the need for the primitive assembly stage (circuit) to store the processed vertices (vertex attributes) while assembling the primitives, thereby reducing the storage requirements for the primitive assembly process (circuit). In particular, as in the technology described herein the primitive assembly process only requires the indices and the primitive configuration information in order to assemble the primitives, and outputs (in an embodiment only) an identifier and a set of indices for each primitive, there is no need to store any further vertex information, such as vertex attributes, at that stage (rather the vertex information, such as vertex attributes, will be fetched and processed later, after the primitives have been assembled and, as discussed above, for only assembled, complete primitives, that are output from the primitive assembly process).

This may be further beneficial where "multi-view" graphics processing is being performed, where in conventional systems the vertex attributes may need to be stored for each of plural separate views of a scene to be rendered. (Indeed, as will be discussed further below, multi-view operation can be achieved with the technology described herein by performing the multi-view "generation" after the primitive assembly process, thereby allowing multi-view operation to be more easily supported.)

The technology described herein is also advantageous in situations where the primitive assembly process needs to be suspended and then resumed at a later time, for example where the generation of the output in question needs to be interrupted so that the graphics processor can perform other processing.

In such situations, it may be necessary to perform all the processing up to the point at which that processing was suspended when resuming the primitive assembly process, for example in order to generate the correct state (information) for the resume point.

In the technology described herein, re-performing the processing up to the resume point will only require the use of the relevant vertex indices and the primitive configuration information to assemble the primitives prior to the suspend point, in contrast to arrangements in which vertex (attribute) processing is performed prior to primitive assembly, which may in that case require all the previously performed vertex (attribute) processing up to the resume point to be repeated, so as to ensure that the correct state for the resume point has been generated.

Thus, suspending and resuming the primitive assembly operation will be more efficient in the technology described herein, as on the resume operation, only the primitive assembly using the vertex indices will need to be repeated up until the resume point (rather than, e.g., having to repeat vertex (attribute) processing (shading) up until the resume point).

The set of vertices to be used for primitives to be processed when generating the output, the set of vertex indices referencing vertices in the set of vertices, and the primitive configuration information indicating how the vertex indices are to be assembled into primitives for processing when generating the output, that are used and provided in the technology described herein may be provided in any suitable and desired manner. They may, for example, be provided by an application that requires the graphics processing in question, and/or be generated and then provided by a driver for the graphics processor, e.g., and in an embodiment, in response to commands and data received from an application that requires graphics processing.

The vertices, vertex indices and primitive configuration information can be made available to the graphics processor in any suitable and desired manner. For example, and in an embodiment, the vertices and vertex indices at least may be stored (e.g., and in an embodiment, as appropriate arrays) in memory from where they can then be fetched by the graphics processor for use. The primitive configuration information may equally be stored in memory for use by the graphics processor. It may, for example, be provided in the form of a descriptor associated with and for the output to be generated.

The sets of vertices and vertex indices that are being processed can be any desired and suitable sets of vertices and vertex indices to be processed when generating an output. Thus the sets of vertices and vertex indices may comprise (and in one embodiment do comprise) the entire set of vertices and the entire set of vertex indices defined for a given graphics processing output, such as for a frame to be displayed. They may also comprise a set of vertices and set of vertex indices that is defined for less than the entire output, such as a set of vertices and a set of vertex indices defined for a given draw call, and/or for a tile to be generated (in a tile-based graphics processor and graphics processing pipeline). In an embodiment, the set of vertices and set of vertex indices are a set of vertices and a set of vertex indices defined for a draw call.

Correspondingly, the output that is being generated may comprise an entire (complete), e.g. frame, or only part of an overall output (e.g. frame), such as a (rendering) tile.

Where the sets of vertices and vertex indices are less than the entire sets of vertices and vertex indices defined for a given output, then in an embodiment the operation in the manner of the technology described herein is repeated for each set of vertices and vertex indices (e.g., and in an embodiment, for each draw call and/or tile) for the output. Correspondingly, the process of the technology described herein is in an embodiment repeated for plural, and in an embodiment for each, output to be generated, e.g. for successive frames in a sequence of output frames, and/or for each tile making up an overall output, e.g. frame.

Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question.

There may also be some attributes that are "per-primitive" (but which are determined in the same way in the vertex shader (per vertex)), with the attribute(s) from the "provoking" vertex then being used for the primitive. Examples of these types of attributes are: primitive ID; layer ID; point size; and a primitive variable rate shading value. The technology described herein can and in an embodiment does, handle such "primitive" attributes in the same way (where it is appropriate to do that).

Each vertex index in the set of vertex indices for the output to be generated will identify (index) a corresponding vertex that is provided in the set of vertices for the output. Thus the vertices will each be identifiable by a corresponding index that (uniquely) identifies the vertex in the set of vertices. In an embodiment the indices are the "input" indices for the vertices as provided (e.g. by the application/driver) prior to any processing of the vertices.

The same vertex index may appear more than once in the set of vertex indices for the output, and/or it may be the case that some vertices in the set of vertices for the output will not in fact be included in the set of indices for the output.

The set of vertex indices for the output to be generated is in an embodiment provided to the primitive assembly process as an appropriate sequence of vertex indices, in the order in which the indices are to be used for primitives for the output.

The primitive configuration information that is provided for the output can be any suitable and desired information that is indicative of, and that defines, how the vertex indices are to be used for (configured into) the primitives for processing for the output. In an embodiment, the primitive configuration information indicates the type of primitives to be assembled using the sequence of vertex indices, i.e. whether the primitives should, for example, be in the form of triangles, triangle strips, triangle fans, or other forms of configuration (such as lines or points).

The primitive assembly operation and circuit in the technology described herein can use the set of vertex indices, together with the primitive configuration information, defined for the output being generated, to assemble the primitives that are then to be processed when generating the output in any suitable and desired manner.

In an embodiment, the primitive assembly process and circuit works its way through the sequence of vertex indices defined for the output (in the vertex index sequence order), and assembles primitives therefrom based on the configuration information, with each primitive comprising an appropriate sequence of indices (for the primitive configuration required) from the sequence of vertex indices for the output.

Thus the primitive assembly process/circuit should, and in an embodiment does, fetch vertex indices from the set (array) of vertex indices in their (desired) sequence order, and "assemble" respective sub-sequences of the fetched vertex indices corresponding to primitives based on the primitive configuration information. Correspondingly, the primitive assembly process in an embodiment includes a step of fetching the vertex indices from the set (array) of vertices and outputting the vertices as a stream of vertices in the (desired) vertex index order to the primitive assembly process for assembling into primitives. Correspondingly, the graphics processor, and in an embodiment the primitive assembly circuit, in an embodiment includes an index fetcher (an index fetching circuit) that is operable to read and fetch indices from the (stored) set of indices (from the index array) and output a sequence (stream) of indices for assembling into primitives.

For example, where the primitive configuration indication indicates that primitives in the form of triangles should be generated, the primitive assembly process and circuit will output respective sets of three successive indices from the sequence of vertex indices (thereby providing a sequence of triangles for processing). For triangle strips, again the sequence of assembled primitives will comprise respective sets of three indices from the sequence of vertex indices, but in that case each successive triangle will reuse the last two indexes in the previous triangle (and the index order will, e.g., be reversed)). Other primitive types will be configured correspondingly.

The primitive assembly operation (circuit) is in an embodiment configured to output "complete" primitives only (i.e. sequences of the vertex indices for "complete" primitives only). Thus where only an "incomplete" or "degenerate" primitive can be assembled from a given set of indices from the index sequence, in an embodiment no primitive is output by the primitive assembly process/circuit.

Thus any "faulty" (incomplete or degenerate) primitives are in an embodiment "removed" at the primitive assembly stage, thereby avoiding performing vertex (attribute) fetching and processing for vertices that are only included in degenerate or incomplete primitives.

Correspondingly, the primitive assembly operation (circuit) is in an embodiment able to recognise and discard any "faulty" (incomplete or degenerate) primitives, such that it will then output only complete primitives for further processing. This may be done, for example, and in an embodiment, in accordance with the graphics API in question.

In an embodiment, the primitive assembly operation/circuit is configured to and operable to output "simple" primitives, such as triangles, lines or points. In an embodiment the primitive assembly operation/circuit is operable to convert more complex primitives (such as line strips, line links, triangle strips, triangle fans, quads, quad strips, lines with adjacency, line strips with adjacency, triangles with adjacency and triangle strips with adjacency) into simpler primitives, such as, and in an embodiment, one or more of: triangles, lines or points (which "simpler" primitives are then output by the primitive assembly process/circuit for further processing).

Indeed, it is believed that the technology described herein may be particularly advantageous in the case of primitives with adjacency (which are primitive types that include adjacent vertices (such that a triangle with adjacency will consist of six vertices, with three vertices that define the triangle plus three adjacent vertices)). In the technology described herein, the adjacent vertices of a primitive with adjacency can be discarded after the primitive assembly from the vertex indices, thereby avoiding any attribute processing (vertex shading) of the adjacent vertices (in contrast to arrangements where the primitive assembly takes place after the vertex shading, in which case the adjacent vertices will be vertex shaded, even though they will be subsequently discarded).

The output of the primitive assembly process (circuit) is a sequence of (plural) primitives to be processed, with each primitive that is output from the primitive assembly process comprising an identifier for the primitive and a sequence of vertex indices for the primitive.

The identifier for each output primitive can be any suitable and desired identifier that can be used to uniquely identify the primitive within, e.g., and in an embodiment, the set of primitives in question (e.g. the set of primitives for the output in question). In one embodiment, the primitives are simply numbered in sequence (by the primitive assembly process/circuit) with the sequence number for each primitive acting as its identifier. Other arrangements would, of course, be possible.

In an embodiment, the primitive identifiers assigned by the primitive assembly process (circuit) may be overridden by a later identifier that is generated for and/or assigned to the primitive in question, for example as a result of vertex (attribute) processing. In an embodiment, the primitives output by the primitive assembly process (circuit) may also have associated with them a flag to indicate whether the identifier allocated to the primitive by the primitive assembly process can be overridden by another (e.g. a later) primitive identifier or not.

The primitive assembly process (circuit) can also output other information (e.g. state) for a (and each) primitive, if desired. (However at this stage the primitive assembly process (circuit) should not, and in an embodiment does not, output any vertex attributes in association with the assembled primitives.)

In an embodiment, the primitive assembly process (circuit) outputs from a (and each) assembled primitive only an identifier for the primitive, and a sequence of vertex indices for the primitive.

Thus, in an embodiment, the primitive assembly process of the technology described herein comprises (and the primitive assembly circuit is correspondingly configured to) fetching indices from a sequence of vertex indices defined for the output being generated in the vertex index sequence order, organising (e.g. dividing) the fetched vertex indices into respective sub-sequences of vertex indices corresponding to complete primitives based on the primitive configuration information, and outputting each respective sub-sequence of vertex indices corresponding to a complete primitive as an assembled primitive in association with, at least, an identifier for the primitive (which in an embodiment is a respective sequence number for the primitive).

Once the (complete) primitives have been assembled and output by the primitive assembly process (circuit), then one or more attributes for vertices of the assembled primitives are fetched based on vertex indices of the assembled primitives.

(Correspondingly, in an embodiment, no vertex attribute fetching is performed prior to the assembly of the vertex indices into (complete) primitives, i.e. such that any vertex attribute fetching is only performed for those vertices that are indicated by vertex indices that are included in and used for primitives output by the primitive assembly process (circuit).)

The vertex attributes that are fetched for the vertices at this stage can be any suitable and desired vertex attributes (attributes that are associated with the vertices in the set of vertices). It would be possible in this regard to fetch all of the attributes (the data values for all of the attributes) associated with each vertex, or only a subset of some but not all of the attributes for the vertices could be fetched at this stage (with, e.g., and in an embodiment, the attributes that are not fetched at this stage then being fetched at a later stage of the graphics processing pipeline).

In an embodiment, only some, but not all, e.g. one, of the attributes, are fetched for vertices of the assembled primitives based on vertex indices of the assembled primitives before the primitives together with their fetched attributes are sent onwards for processing, with one or more other attributes for vertices of the assembled primitives then being fetched for processing at a later stage of the graphics processing pipeline.

In the case where only some but not all of the vertex attributes are fetched based on the vertex indices of the assembled primitives at this stage, then in an embodiment at least a position is fetched. In an embodiment, only a position attribute (the position) is fetched for a vertex (vertex index).

Usually there will only be a single position attribute, consisting of (X, Y, Z, W) components. In this case, the vertex attribute that is fetched will comprise (at least, and in an embodiment only) that single position attribute. However, there may also be other position attributes, such as a point size or a line width (e.g. when rendering points and lines), which could be fetched as well, if desired.

Thus, in an embodiment, only position attribute(s) are fetched at this stage (and thus in an embodiment no varyings are fetched at this stage), but it would be possible to fetch one or more other (non-position) attributes as well as one or more position attributes, if desired. Such (non-position) attributes could, for example, be one or more or all of: line width/point size; a primitive shading rate; layer ID; and primitive ID.

The vertex attribute or attributes can be fetched (from the memory where they are stored) in any suitable and desired manner. In an embodiment, this is done via a cache (a "vertex cache") that is configured to store vertex attributes, with it correspondingly being determined whether the required attribute (vertex) is already present in the cache or not, and in the case where the attribute is not already present in the cache, then triggering the fetching of the attribute (from memory) into the cache (e.g., and in an embodiment, in accordance with the normal cache operation for the graphics processor and data processing system in question).

Thus, in an embodiment, the vertex attribute fetching stage (circuit) comprises a cache (a vertex cache) that stores fetched vertex attributes, e.g., and in an embodiment, in association with the indices for the vertices (which indices will, in an embodiment, be used as the corresponding identifiers (parts of the tag) for the cache entries (the cache lines)).

In this case therefore, indices for primitives output by the primitive assembly operation will be looked up in the vertex cache and when the vertex being looked up is not already present in (or being fetched into) the vertex cache (i.e. there is a cache miss), the fetching of the relevant attribute for the vertex from memory (into the vertex cache) will be, and is in an embodiment, triggered.

The fetching of one or more attributes for vertices of the assembled primitives based on vertex indices of the assembled primitives should, and in an embodiment does, result in all the (desired) attributes for all the vertices of the assembled primitives being fetched based on the vertex indices of the assembled primitives. Thus this could comprise for each and every vertex index of an assembled primitive, fetching the desired one or more attributes for that vertex (for the vertex that the index indicates).

However, and as will be discussed further below, in embodiments at least some previously fetched (e.g. recently fetched) attributes for vertices are, in an embodiment temporarily, stored (retained), with any previously fetched (and still retained) vertex attributes then not needing to be, and in an embodiment not being, (re)fetched when the same vertex (the same vertex index) appears in another primitive.

As discussed above, in graphics processing it may be, and typically can be, the case that at least some of the initially defined attribute values for a vertex need to be processed in some way before they are used by the graphics processor when generating an output. For example, positions defined for a vertex may need to be transformed from the (e.g. model) space that they are initially defined in, into the (e.g. screen) space that the output will be generated for (and with respect to). This processing of vertex attributes may typically be referred to as "vertex shading".

In the technology described herein, as well as fetching one or more attributes for vertices of the assembled primitives based on vertex indices of the assembled primitives, the appropriate vertex processing (vertex shading) of the attribute or attributes being fetched is also performed and triggered (where necessary) in response to and based on the vertex indices of the assembled primitives output from the primitive assembly process (circuit).

Thus, the fetching of one or more attributes for vertices of the assembled primitives, and any necessary vertex (attribute) processing (vertex shading) for the attributes being fetched is performed based on vertex indices of the assembled primitives.

In an embodiment, when a vertex attribute is being fetched based on a vertex index of an assembled primitive, any necessary vertex attribute processing (vertex shading) for the attribute in question is also triggered and performed at that time (and, e.g., and in an embodiment, in response to the attempt to fetch the attribute for the vertex indicated by the vertex index).

Correspondingly, the vertex fetching stage (circuit) that is operable to fetch vertex attributes for vertices indicated by the indexes of the primitives output by the primitive assembly operation, is also configured to, and operable to, trigger, where necessary, appropriate processing (vertex shading) of the fetched vertex attributes so that appropriately processed (shaded) vertex attributes will be fetched.

Similarly, the fetched vertex attributes (and the vertex attributes that are stored in the, e.g. vertex cache) will be, and are in an embodiment, where appropriate, appropriately processed (vertex shaded) values for the vertex attributes in question.

This will then have the effect of performing any vertex attribute processing (vertex shading) for attributes of vertices conditionally, and "on demand", based on, and in dependence upon, whether the vertex is included in an assembled primitive or not.

Correspondingly, in an embodiment, no vertex attribute processing (vertex shading) is performed prior to the assembly of the vertex indices into (complete) primitives, i.e. such that any vertex attribute processing (vertex shading) is only performed for those vertices that are indicated by vertex indices that are included in and used for primitives output by the primitive assembly process (circuit).

The vertex attribute processing (vertex shading) that is triggered and performed in this regard can be any suitable and desired vertex attribute processing (vertex shading), e.g., and in an embodiment, in dependence upon the vertex attributes that are being fetched. All of the attributes that are being fetched may be subjected to appropriate vertex processing (vertex shading) (e.g. where that is required), or, e.g., only some but not all of the attributes being fetched could be subjected to processing (vertex shading), e.g., and in an embodiment, where there is an attribute or attributes that are being fetched that would not (normally) be subjected to any further processing (vertex shading) to change its initially defined (input) values.

In an embodiment where, as discussed above, a position is fetched for a vertex, then in an embodiment the fetched position (position attribute) is subjected to appropriate processing (vertex shading), e.g., and in an embodiment, to transform the position from the (e.g. model) space that it is initially defined in, to the appropriate (e.g. screen) space for the output that is being generated. Thus, in an embodiment, a (any) positions of the vertices that are being fetched are subjected to an appropriate vertex shading operation as part of the "fetching" process.

Thus, in an embodiment, the vertex attribute fetching stage (circuit) is operable and configured to fetch (transformed) vertex positions for vertices indicated by indices for complete primitives output by the primitive assembly operation, and, in an embodiment, to trigger the appropriate position shading (transformation) of the vertex positions before they are fetched.

In an embodiment, any attribute that is being fetched that would normally be subjected to vertex processing (vertex shading) before use is in an embodiment subjected to the appropriate vertex shading operation as part of the "fetching" process (i.e. such that the appropriately processed (vertex shaded) attribute values will be fetched).

For any attributes that are not fetched at this stage (and thus not subjected to any vertex shading at this stage), those attributes can be, and are in an embodiment subjected to any required vertex shading at the time that they are fetched for use (at the appropriate later stage of the graphics processing pipeline where they are fetched for use).

In the case where a vertex attribute being fetched is to be subjected to vertex processing (vertex shading), then the fetching of the attribute in an embodiment fetches (and returns to the vertex cache, for example) both the processed (shaded) attribute value or values itself, together with any other data values, such as state information, that may be generated as a result of the vertex processing (vertex shading). For example, and in an embodiment, in the case of vertex shading a position (position shading), the position shading operation may also, for example, generate one or more parameters (values), such as one or more of: variable rate shading parameter values, a point size, a line width and/or a layer ID, etc. In this case, these additional parameters are in an embodiment also fetched along with the "processed" position. Other arrangements would, of course, be possible.

The actual vertex attribute, e.g. position, processing (shading) can be performed in any suitable and desired manner. This is in an embodiment done by executing an appropriate vertex shader (e.g. position shader) to perform the vertex shading, with the result of that vertex shading (e.g. position shading) operation then being stored in memory and fetched therefrom for the vertex.

Thus, in an embodiment, the graphics processor further comprises one or more execution units (circuits) (shader cores) operable to execute shader programs, including vertex shader programs, to perform processing operations on input data values, and the vertex attribute processing (shading) is performed by the execution unit or units (shader core or cores) executing appropriate vertex shading programs.

Thus, in an embodiment, the vertex attribute fetching stage (circuit), and in an embodiment the vertex cache, is operable to and operates to, trigger the execution of an appropriate vertex shader (program) (e.g. a position shader) to perform the vertex shading, e.g., and in an embodiment by sending a vertex (e.g. position) shading request, to trigger the appropriate vertex (e.g. position) shading operation for the attribute or attributes in question, and the storing of the processed vertex attribute (e.g. position) (and any other data generated by the vertex shading) in memory (and then fetches the processed (shaded) attribute (e.g.) from the memory, e.g. into the cache).

The request for the vertex shading operation to be performed can take any suitable and desired form. In an embodiment, the request comprises information needed by the graphics processor to be able to carry out the vertex shading operation, such as, for example, and in an embodiment, (at least) the index for the vertex to be processed, and an indication of the shader program to be executed. In an embodiment the request includes information (an indicator) that identifies it as being a request to trigger the vertex shading operation, and/or an identifier that identifies the request. The request may also indicate, and/or allow to be determined, the location in memory at which the output (vertex-shaded attribute) data should be stored.

The request for the vertex shading could be sent directly to an execution unit (shader core) that is configured to execute vertex shading operations. However, in an embodiment, the request is sent to a management circuit of the graphics processor, e.g. that is operable to receive and/or distribute respective processing tasks (jobs) to processing units (functional units) of the graphics processor (which management unit will then issue the vertex shading operation to an available shader processing (execution) core).

Once the relevant vertex attributes for the assembled primitives have been fetched, then the assembled primitives including their fetched vertex attributes can be, and are, provided to later stages of the graphics processing pipeline for processing. This can be done in any suitable and desired manner.

In an embodiment, the graphics processor further comprises, (logically) after the vertex attribute fetching stage (circuit), a "late" primitive assembly process (stage) (and circuit) that is operable to and configured to output a sequence of one or more assembled primitives to be processed (corresponding to the sequence of primitives provided to the vertex fetching stage (circuit)), with, in this case (and at this stage), each assembled primitive of the sequence of assembled primitives comprising (at least (and in an embodiment, only)) an identifier for the primitive and a set of one or more vertex attributes for (and corresponding to) each vertex for the assembled primitive.

This late primitive assembly stage (circuit) is thus in an embodiment operable and configured to associate fetched vertex attributes (and any other fetched data) with the relevant assembled primitives, and to output a sequence of assembled primitives that include the appropriate fetched vertex attributes, to later stages of the graphics processing pipeline for execution.

Thus in an embodiment, the method of the technology described herein includes (and the graphics processor correspondingly comprises) both an "early" primitive assembly stage (circuit) operable to assemble primitives from vertex indices based on the primitive configuration information and output a sequence of assembled primitives comprising an identifier for each primitive and a set of indices indicating the vertices for the primitive, which is then followed by a "late" primitive assembly stage (circuit) after the vertex attribute fetching, which late primitive assembly process (circuit) outputs a sequence of assembled primitives to be processed, with each assembled primitive of that stage comprising an identifier for the primitive and a set of one or more vertex attributes for (and corresponding to) each vertex for the assembled primitive (based on the indicated vertex indices for the assembled primitive output from the early primitive assembly stage (circuit)).

The "late" primitive assembly process (circuit) accordingly in an embodiment receives (and/or fetches) as input the (sequence of) assembled primitives from the initial (early) primitive assembly stage (circuit) and the fetched vertex attributes (and any other fetched data) from the vertex attribute fetching stage (circuit), and outputs based on and using those inputs, a (corresponding) sequence of assembled primitives including, for each primitive, one or more (fetched) vertex attributes for the vertices for the primitive in question. The late primitive assembly process (circuit) should, and in an embodiment does, output the same sequence of assembled primitives (and in the same primitive (sequence) order) as the sequence of assembled primitives that is output by the initial (early) primitive assembly process (circuit).

The late primitive assembly process (circuit) will output for each primitive the corresponding vertex attribute or attributes (and any other data) that have been fetched for that primitive based on the vertex indices for the primitive. Thus, in the embodiment discussed above where the vertex attribute that is fetched is a position for each index (vertex), the late primitive assembly process (circuit) will output for each assembled primitive, an appropriate set of (in an embodiment appropriately transformed) positions for the primitive, i.e. the (transformed) position for each index (vertex) of the primitive in question.

The late primitive assembly stage (circuit) in an embodiment determines the vertices (the vertex attributes) to use for assembled primitives on the basis of the indices for the assembled primitives received from the early primitive assembly stage (circuit). In an embodiment, the late primitive assembly stage (circuit) fetches (pulls) the vertices (the fetched vertex attributes) appropriately from where they are stored as it receives (the vertex indices for) primitives from the early primitive assembly stage (circuit). (It would alternatively be possible for the vertices (the fetched vertex attributes) to be "pushed" from their storage to the late primitive assembly stage (circuit), if desired.)

It would be possible in this regard for all of the vertices (the fetched vertex attributes) to be used by the late primitive assembly stage to be stored in the vertex cache and used therefrom by the late primitive assembly stage (circuit) (and in one embodiment, that is the case). In this case, the late primitive assembly stage (circuit) would fetch (or receive) the vertices (the fetched vertex attributes) that it needs for primitives from the vertex cache.

In an embodiment, the late primitive assembly stage (circuit) is configured to and operable to store (fetched) vertex attribute(s) (and any other data) for a set of one or more, and in an embodiment plural, "previously used" vertices (vertex indices) (e.g., and in an embodiment, a set of previously used vertex positions), corresponding to, and comprising, vertex attributes (e.g. positions) (and any other fetched vertex data) that have previously been used for assembled primitives that have been sent onwards for processing.

The late primitive assembly stage (circuit) in an embodiment includes (maintains) (has associated with it) an appropriate buffer (a used vertex buffer) for this purpose, in which the fetched attributes (e.g. positions) for vertices for assembled primitives are stored.

The late primitive assembly stage (circuit) in an embodiment stores (up to) a particular, in an embodiment selected, in an embodiment predetermined (maximum) number of different vertices (the fetched vertex attributes for (up to) a particular maximum number of vertices), e.g., and in an embodiment, in an appropriate buffer, with any vertex being stored (retained in the buffer) until it is replaced by another vertex (or the storage (e.g. buffer) is otherwise cleared, e.g. because the processing of the output in question has been completed).

The number of previously used vertices that are stored does not need to be very large, for example four vertices may be sufficient. In an embodiment, the maximum number of vertices that can be stored is between 4 and 32 vertices.

The late primitive assembly stage (circuit) (the used vertex buffer) in an embodiment stores vertices (vertex attributes) according to some form of "recently used" protocol, and can, and in an embodiment does, store vertices (vertex attributes) and retain those vertices (vertex attributes) until they need to be (and are) replaced by a new (different) vertex (that is needed for a new primitive). The used vertex buffer could, e.g., store the recently used vertices (vertex attributes) on a first-in, first-out basis, or a more sophisticated replacement policy, such as a least recently used replacement policy, could be used if desired.

In these embodiments, the "previously used" vertex storage (buffer) should be, and is in an embodiment, in addition to any (the) vertex cache (as discussed above).

In these arrangements, the primitive assembly stage (circuit) could fetch (receive) (all) the vertices (the fetched vertex attributes) that it needs for primitives from its "previously used" vertex storage (buffer) (with any vertices being transferred into that storage (buffer), e.g. from the vertex cache first), but in an embodiment, the fetched vertices (the fetched vertex attributes) to be used by the late primitive assembly stage (circuit) may be stored in, and used from, both the "previously used" vertex storage (buffer) and the vertex cache, as appropriate.

Thus, in an embodiment, the late primitive assembly stage (circuit) is configured to fetch (and/or receive) vertices for assembled primitives both from a "previously used" vertex storage (buffer) associated with the late primitive assembly stage (circuit) and from the vertex cache. In this case, where a vertex has been fetched (or received) from the vertex cache by the late primitive assembly stage (circuit), that vertex will be (in an embodiment) added to the previously used vertex (buffer) (according to the storage/replacement policy for the previously used vertex storage (buffer)).

The Applicants have recognised in this regard that storing "previously used" vertices in this way (and in addition to the vertex cache) will have the effect, in particular, of reducing the load on the vertex cache, by allowing the previously used vertices to be read from the previously used vertex storage (buffer) instead.

In particular, the applicants have recognised that triangles, for example, may typically share one side (two vertices) or a single vertex with the previous triangle, such that if the used vertex buffer retains vertices from the previous triangle, it may only be necessary to read one or two vertices from the vertex cache in order to be able to output one primitive (in the case of triangular primitives), thereby reducing the number of cache reads required per cycle to maintain a given primitive output rate.

For example, in the case of triangular primitives, an output rate of one primitive per cycle may be achievable while only reading one or two vertices from the vertex cache in each cycle. (This would be in contrast to the case where all the vertices for a primitive need to be read from the vertex cache, in which case to be able to output one triangular primitive per cycle, it would be necessary to be able to read three vertices from the vertex cache in one cycle.) Correspondingly, to double the primitive rate to two triangles per cycle, for example, would require six vertex cache accesses in every cycle without the presence of the "previously used" vertex storage buffer, but with that storage (buffer), a primitive rate of two triangles per cycle may be achievable while only performing two (or three) cache reads per cycle.

Thus, the late primitive assembly process (circuit) in an embodiment fetches and stores (e.g. in the recently used vertex buffer) the vertices (the vertex attributes) that it needs, e.g., and in an embodiment, from the vertex cache, in response to and based on the indices for assembled primitives output by the (early) primitive assembly stage (circuit). Once a vertex (the fetched attributes for a vertex) have been stored, the vertex (the vertex attribute(s) for the vertex) will be retained until replaced in the storage (e.g. buffer) by a newly required (different) vertex.

Thus, in the case where the late primitive assembly stage (circuit) stores a set of (recently) used vertices (in addition to the vertex cache), in an embodiment, it is (first) checked for a (and each) primitive output from the (early) primitive assembly operation (circuit) whether (any of) the vertices (the relevant attributes for the vertices) indicated for the primitive are already stored by the late primitive assembly stage (circuit) or not (e.g. are already stored in the (recently used) vertex buffer or not).

If any of the vertices are already stored by the late primitive assembly stage (circuit), then the late primitive assembly stage will use those vertices from its (recently used) vertex store (buffer).

On the other hand, if any of the vertices indicated for the primitive are not stored by the late primitive assembly stage (circuit) (are not in the (recently used) vertex buffer), then the late primitive assembly stage will use (e.g. fetch) those vertices (the relevant attributes for the vertices) from the vertex cache. If the relevant vertex or vertices (the relevant attributes for the vertices) are already stored in the vertex cache, then the late primitive assembly stage (circuit) will simply use (e.g. fetch) the vertices from the vertex cache. On the other hand, if the relevant vertex or vertices are not already stored in a vertex cache either, then the fetching of the desired attribute or attributes for the vertex (into the vertex cache) (and any necessary vertex shading) will be triggered (as discussed above).

Equally, in the case where the late primitive assembly stage (circuit) stores a set of (recently) used vertices (in addition to the vertex cache), then in an embodiment, it is (first) checked for a (and each) primitive output from the (early) primitive assembly operation (circuit) whether (any of) the vertices (the relevant attributes for the vertices) indicated for the primitive are already stored by the late primitive assembly stage (circuit) or not (e.g. are already stored in the (recently used) vertex buffer or not), before triggering any fetching of the desired attribute or attributes for the vertex (and any necessary vertex shading) (and with the fetching of the relevant attribute or attributes (e.g. the position) for a vertex for an assembled primitive, if required, then only being performed in the case where it is determined that the vertex in question is not already stored by the late primitive assembly stage (circuit) (present in the recently used vertex buffer)).

In other words, for each vertex index for an assembled primitive output by the early primitive assembly stage (circuit), it will first be checked whether the (relevant) attributes for that vertex (that vertex index) are already stored by the late primitive assembly stage (circuit), before fetching the relevant attribute or attributes for that vertex from the vertex cache (and triggering the fetching of the relevant attribute or attributes for that vertex into the vertex cache (if required)).

In this case therefore, the vertex attribute fetching process (circuit) in an embodiment accordingly comprises an initial index checking operation (circuit) that receives the complete primitives from the (early) primitive assembly operation, and is operable to and configured to determine from an index for a primitive, whether the vertex in question is already stored by the late primitive assembly stage (circuit) (is already present in the recently used vertex buffer) or not. This initial index checking operation (circuit) is correspondingly in an embodiment (logically) arranged between the early primitive assembly process (circuit) and the vertex attribute fetching process (circuit).

This check is in an embodiment done for each and every index for each and every assembled primitive received from the (early) primitive assembly operation.

It can be determined whether a vertex (the relevant attributes for the vertex) is already stored by the late primitive assembly stage (circuit) (in the recently used vertex buffer) in any suitable and desired manner. In an embodiment, this is done by keeping track of the vertices that are (currently stored) by the late primitive assembly stage (circuit) (are present in the recently used vertex buffer), for example, and in an embodiment, by maintaining and storing information indicating which vertices are currently stored by the late primitive assembly stage (circuit) (present in the recently used vertex buffer). Such information could take any suitable and desired form. For example, a (vertex) bitmap that includes respective entries for each vertex (index) could be used to indicate and track whether a given vertex is currently stored by the late primitive assembly stage (present in the recently used vertex buffer) or not.

The vertex indices for a new primitive may then be checked against the (indices of) vertices stored by the late primitive assembly stage (present in the recently used vertex buffer), to see if the vertex is already stored by the late primitive assembly stage (present in the recently used vertex buffer) or not.

In this operation, when it is determined that the vertex for a new primitive is already stored by the late primitive assembly stage (present in the recently used vertex buffer), then it is correspondingly in an embodiment determined that there is no need to fetch the relevant attribute(s) for that vertex (and to do any processing (vertex shading) of the attribute(s) for that vertex) (as the vertex and the relevant processed attribute(s) will already be stored by the late primitive assembly stage (present in the recently used vertex buffer)). Thus in this case, the fetching operation, e.g. a look-up into the vertex cache, is (in an embodiment) not triggered.

On the other hand, when it is determined that a vertex for a primitive is not stored by the late primitive assembly stage (is not already present in the recently used vertex buffer), then the relevant attribute(s) (e.g. position) for the vertex will need to be fetched into the vertex cache (if they are not already there), and so the fetching process and any necessary vertex processing (vertex shading) must be triggered (and performed as required). In this case therefore, the fetching process for the desired attribute or attributes for the relevant index is in an embodiment triggered, in an embodiment by performing a look-up for the relevant index in the, e.g. vertex cache, to trigger the fetching of the vertex attribute(s) (and any necessary vertex shading), if required (as appropriate).

Thus, in an embodiment when it is determined that the late primitive assembly stage (circuit) already stores the relevant attributes for a vertex for an assembled primitive output by the early primitive assembly stage (circuit), then the fetching of the relevant attributes for that vertex is not (is otherwise than) performed (i.e. no request to fetch the attributes for that vertex is sent (to the vertex cache)), but when it is determined that the relevant attributes for the vertex in question are not already stored by the late primitive assembly stage (circuit), then the fetching of the relevant attributes for the vertex in question (a lookup in the vertex cache for the relevant attributes for the vertex in question) is triggered.

In either case, and in any event, the assembled primitives (the indices for the vertices for the assembled primitives) from the early primitive assembly stage (circuit) should be, and are in an embodiment, sent to the late primitive assembly stage (circuit), which will then associate the relevant vertex attributes (e.g. positions) with the primitives, e.g., and in an embodiment, from the store of recently used vertices maintained by the late primitive assembly stage (circuit) and/or the vertex cache, as required, and send the primitives, with their associated vertices (vertex attributes), onwards for processing.

Correspondingly, it will be appreciated from this that some vertex indices of assembled primitives output by the early primitive assembly stage (circuit) will be sent both to trigger the fetching of the relevant vertex attributes (e.g. to the vertex cache), and to the late primitive assembly stage (circuit), but with other indices for vertices of assembled primitives only being sent to the late primitive assembly stage (circuit) (i.e. bypassing the vertex attribute fetching operation (e.g. the vertex cache)) (in the case where the relevant vertex attributes are already stored by the late primitive assembly stage (circuit)).

Correspondingly, the indices for some vertices of the assembled primitives will be sent both to the vertex fetching process (circuit) (e.g. to the vertex cache) and to the late primitive assembly process (circuit), but other indices for the assembled primitives will be sent only to the late primitive assembly process (circuit) (and it may be the case that different vertices (indexes) for the same primitive will be treated differently, e.g. where one vertex is a vertex that has been used in a previous primitive, but another vertex is "new").

Correspondingly, the initial index checking operation (circuit) that receives the complete primitives from the early primitive assembly operation (circuit) is in an embodiment operable to selectively send the index for a primitive either to both the vertex attribute fetching process (circuit) (e.g. the vertex cache) and to the late primitive assembly stage (circuit), or only to the late primitive assembly stage (circuit), e.g., and in an embodiment, in dependence upon whether it is determined that the relevant vertex is already stored by the late primitive assembly stage (circuit) or not.

Thus, in an embodiment, it is first determined from the vertex index for a primitive output by the early primitive assembly operation (circuit) whether that vertex is already stored by the late primitive assembly stage (circuit) (in the recently used vertex buffer), and when the vertex is not already stored by the late primitive assembly stage (circuit) (in the recently used vertex buffer), the index is forwarded to the vertex attribute fetching stage for the vertex (attributes)) in question to be looked up and fetched as required, and then once the vertex in question has been fetched (and any vertex processing performed), the processed vertex is used and stored by the late primitive assembly stage (circuit) (in the recently used vertex buffer), but when it is determined that the vertex is already stored by the late primitive assembly stage (circuit) (present in the recently used vertex buffer), the index is not (is other than) sent to the vertex attribute fetching stage (circuit), and is sent to the late primitive assembly stage (circuit) without also being sent to the vertex attribute fetching stage (circuit).

It will be appreciated from the above that by retaining recently used vertices (e.g. positions) in the late primitive assembly stage (circuit) (recently used vertex buffer), and only triggering the fetching and processing of "new" vertices that are not already present in the late primitive assembly stage (circuit) (recently used vertex buffer), the number of fetches of vertex attributes and the amount of vertex attribute processing (vertex shading) that is performed for the assembled primitives may be reduced, and in particular the amount of duplicated vertex fetching and vertex shading that is performed for the assembled primitives may be reduced and/or avoided. This may be particularly advantageous in the case of primitive types such as triangle strips where vertices are reused for successive primitives, but may also be advantageous in other cases as well, e.g., depending upon the size of the recently used vertex buffer.

It will also be appreciated that as a result of this operation, the rate at which primitives, including the relevant vertex attributes, can be output from the late primitive assembly process (circuit) will be limited by the number of new vertices for which attributes must be read (i.e. fetched into the vertex cache). The effect of this then is that in many cases the output primitive rate from the late primitive assembly process can be expected for individual triangles to be closer to 1 per cycle (assuming that the vertex attribute fetching operation (e.g. vertex cache) can fetch one vertex per cycle) (in contrast, e.g., to arrangements in which all the vertices for a triangle have to be fetched before the triangle can be assembled). For example, for sequences of individual triangles, but for which the vertex pattern is similar to triangle strips, the primitive rate may be one triangle per cycle, and in general has been found to be potentially of the order of one triangle per 1.8 cycles across many benchmarks and exemplary content.

Correspondingly, an advantage of the technology described herein, in its embodiments at least, is that the throughput of primitives may be increased (e.g. to >1 primitive per cycle), with only minor changes, such as increasing the number of lookups per cycle in the vertex cache. For example, since the primitive throughput is not limited by the number of vertices per primitive, but rather the number of lookups in the vertex cache, if the number of lookups in the vertex cache per cycle can be increased (e.g. doubled), the only other elements of the process which may need changing to support an increased assembled primitive throughput would be the early primitive assembly process (circuit), the late primitive assembly process (circuit), and the checking of whether the vertices are already stored by the late primitive assembly process (circuit), all of which may be done for relatively little additional cost.

Once the assembled primitives including the relevant fetched (and shaded) vertex attributes (e.g. and in an embodiment the shaded vertex positions) have been assembled (by the late primitive assembly stage (circuit), the so-assembled primitives, including their fetched vertex attributes, are then provided to later stages of the graphics processing pipeline that the graphics processor executes for processing.

Thus, the assembled primitives including their fetched vertex attributes are passed onwards for the appropriate further processing in order to process those primitives when generating the output.

The processing of the (assembled) primitives can comprise any suitable and desired primitive processing that may be performed when generating an output.

The processing of the primitives in an embodiment comprises at least rendering the primitives to generate, e.g., and in an embodiment, rendered output data for the primitives. The rendering may be performed by, e.g., rasterising the primitives to fragments and then rendering (fragment shading) the so-generated fragments. Additionally or alternatively, the primitives may be rendered using ray-tracing or hybrid ray-tracing techniques.

Correspondingly, the graphics processor in one embodiment further comprises a rasteriser (rasterisation circuit) and a renderer (rendering circuit) (in an embodiment in the form of a programmable fragment shader).

The processing of the assembled primitives, such as the rasterisation and rendering of the assembled primitives, can be performed in any desired and suitable manner, e.g., and in an embodiment, depending upon and in accordance with the graphics processor and graphics processing pipeline in question. In general, and in an embodiment, the assembled primitives are rasterised and/or rendered, etc., as would normally be done for the graphics processor and graphics processing pipeline in question (as once the primitives are assembled in the manner of the technology described herein, the primitives are no different to primitives that would have been assembled in any other manner).

The assembled primitives, including the vertex attributes, should be, and are in an embodiment, passed to the next stage (circuit) of the graphics processing pipeline that is being executed by the graphics processor. This may be any suitable and desired stage of a graphics processing pipeline that (e.g. immediately) follows the completion of the primitive assembly stage. Thus, in the case where the graphics processor is a tile-based graphics processor, the assembled primitives with their vertex attributes are in an embodiment passed to the tiler (tiling stage) of the graphics processor and graphics processing pipeline for "tiling".

Thus, in an embodiment, the graphics processor is a tile based graphics processor (and the graphics processing pipeline that the graphics processor executes correspondingly performs tile based graphics processing), and the assembled, complete primitives including their associated fetched (and processed) vertex data (attributes) are first provided to the tiling process (a tiler circuit) of the graphics processor and graphics processing pipeline, for the generation of appropriate primitive lists, before the respective primitives are then further processed (e.g. rasterised and rendered).

In the case of an immediate mode renderer, the assembled, complete primitives may be passed to the, e.g. rasteriser, for processing. Other arrangements would, of course, be possible.

As discussed above, in embodiments, the fetching of the vertex attributes following the (early) primitive assembly process fetches (and triggers the processing of) only some but not all of the attributes for each vertex. In this case therefore, other attributes for the vertices of the primitives may be fetched (and where necessary processed (vertex shaded)) during and for subsequent processing of the primitive, e.g., and in an embodiment, at the appropriate stage or stages of the graphics processing pipeline where the vertex attributes in question are required.

In this case therefore, there will be further fetching (and processing (vertex shading)) of other vertex attributes for the primitives, in addition to the vertex attribute fetching (and processing) that takes place when assembling the primitives for processing.

Thus, in an embodiment, the technology described herein further comprises (and the graphics processor includes a processing circuit or circuits operable and configured to) fetching (and where necessary processing (vertex shading)) other attributes for the vertices of the assembled primitives, after the assembled primitives including their fetched vertex attribute(s) have been provided to later stages of the graphics processing pipeline that the graphics processor executes.

Once the primitives have been processed, the output of that processing can then, e.g., and in an embodiment, be written, e.g. to, e.g., a frame buffer in, main memory, from where it can then, e.g., be provided to a display for display, or otherwise processed.

As discussed above, an advantage of the technology described herein is that suspending and resuming of the output of the primitive assembly operation can be and is more efficient. Thus, in an embodiment, the graphics processor is operable to be able to suspend and then resume the primitive assembly operation for a given output being generated. In this case, when suspending the primitive assembly operation, in an embodiment the primitive (sequence) number of the last primitive that was assembled for the output is recorded, and then when resuming the processing for the output in question, the early primitive assembly process for the output is re-started from the beginning, but the primitives output by the (early) primitive assembly process (circuit) are all discarded, until the primitive immediately following the last primitive that was assembled is reached. As discussed above, because the early primitive assembly process in the technology described herein only requires the vertex indices to be read, discarding primitives on early primitive assembly output when resuming a partially processed output will not be overly costly (will have an acceptable cost).

It should be noted in this regard, that depending upon the reason for suspending the processing, it may be the case that the last assembled primitive was added to the primitive lists, but not actually rendered, or it may have been both added to the primitive list and rendered.

Other arrangements would be possible, if desired.

In an embodiment, to further support increased primitive throughput, the (early) primitive assembly stage (process) is operable and configured to detect pairs of primitives with shared edges, and to output such primitive pairs with a shared edge as a single, complete, assembled primitive for processing. In this case, such a primitive pair with a shared edge will have four indices associated with it.

In order to support such operation, subsequent processing stages (circuits) of the graphics processor and graphics processing pipeline should be and are in an embodiment configured to support the passing of (and processing of) four vertices down the pipeline (but this will only be a 33% increase in the data path over the requirements for processing triangles). Correspondingly, such a primitive pair with a shared edge would be processed using one bounding box (e.g. for the tiling process), and encoded as one primitive pair in the primitive lists produced by the tiling process.

In an embodiment, in order to support multi-view operation (i.e. where the same scene is to be rendered from multiple view points), the generation of the (additional) vertices required for each view of a multi-view output is done after the early primitive assembly process (circuit), and before the vertex attributes are fetched, such as, for example, and in an embodiment, by being performed and located (logically) in front of the vertex fetching operation (the vertex cache).

In an embodiment, where the vertex fetching process (circuit) includes an initial check of whether the relevant vertices are stored by a late primitive assembly process (circuit), the additional vertices required for the additional primitives needed for multi-view operation are generated by that initial vertex checking process (circuit).

This will then avoid, for example, needing to store multiple versions of the same vertices in primitive assembly when building the different versions of that primitive in parallel. In contrast, with this arrangement of the technology described herein, the primitive assembly can be performed without the attribute data, and then the different versions of the primitive (with the attribute data) "built" in a sequence (serially)). This reduces the storage required, and in particular avoids the need for "per view" storage (such that any number of views can be supported).

In an embodiment, where "instanced" rendering is being performed, in which a given draw call can include multiple instances, the instance ID that is required in this regard is in an embodiment associated with the primitives by the late primitive assembly stage (circuit). Thus the complete primitives output by the late primitive assembly stage (circuit), for example, to the tiler, will have the instance ID associated with them at that stage (rather than at, for example, the early primitive assembly stage (circuit)). In these arrangements, when starting a new instance, the vertex cache and the recently used vertex storage (buffer) associated with the late primitive assembly stage (circuit) (if any) are in an embodiment flushed, so as to avoid the risk of hitting on previous instances.

The above describes the main elements of the graphics processor and graphics processing pipeline that are involved in the operation in the manner of the technology described herein. As will be appreciated by those skilled in the art, the graphics processor can otherwise include and execute, and in an embodiment does include and execute, any one or one or more, and in an embodiment all, of the other processing stages and circuits that graphics processors and graphics processing pipelines may (normally) include. Thus, for example, the graphics processor may also include a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The output to be generated may comprise any output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc. In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described.

Figure 2:
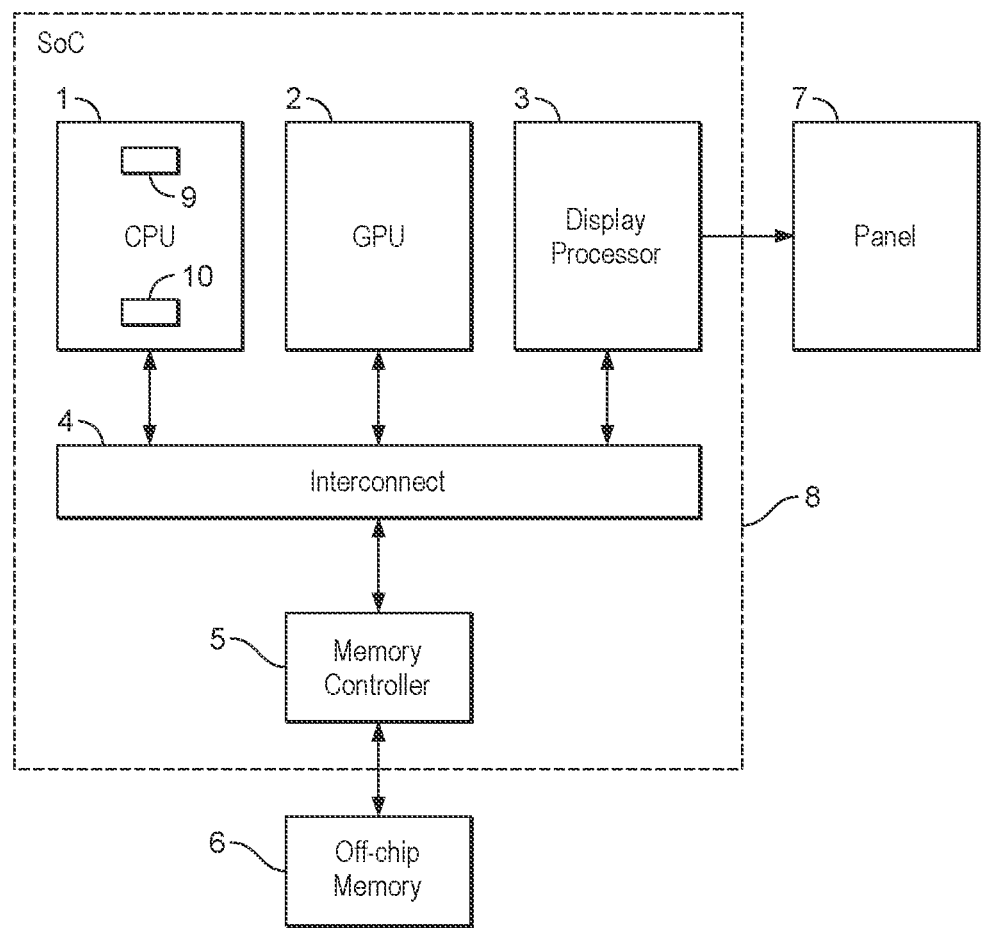
FIG. 2 shows an exemplary data processing system in which the technology described herein may be implemented.

FIG. 2 shows an exemplary system on chip (SoC) graphics processing system 8 that comprises a host processor comprising a central processing unit (CPU) 1, a graphics processor (GPU) 2, a display processor 3, and a memory controller 5. The exemplary data processing system may also comprise a video engine (not shown in FIG. 2). As shown in FIG. 2, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display. The graphics processing pipeline includes and performs similar operations to those illustrated in the graphics processing sequence shown in FIG. 1, but in the present embodiment, in accordance with the technology described herein, an early assembly of the primitives for processing is performed before any vertex processing (vertex shading) takes place (in contrast to the graphics processing sequence shown in FIG. 1).

Figure 3:
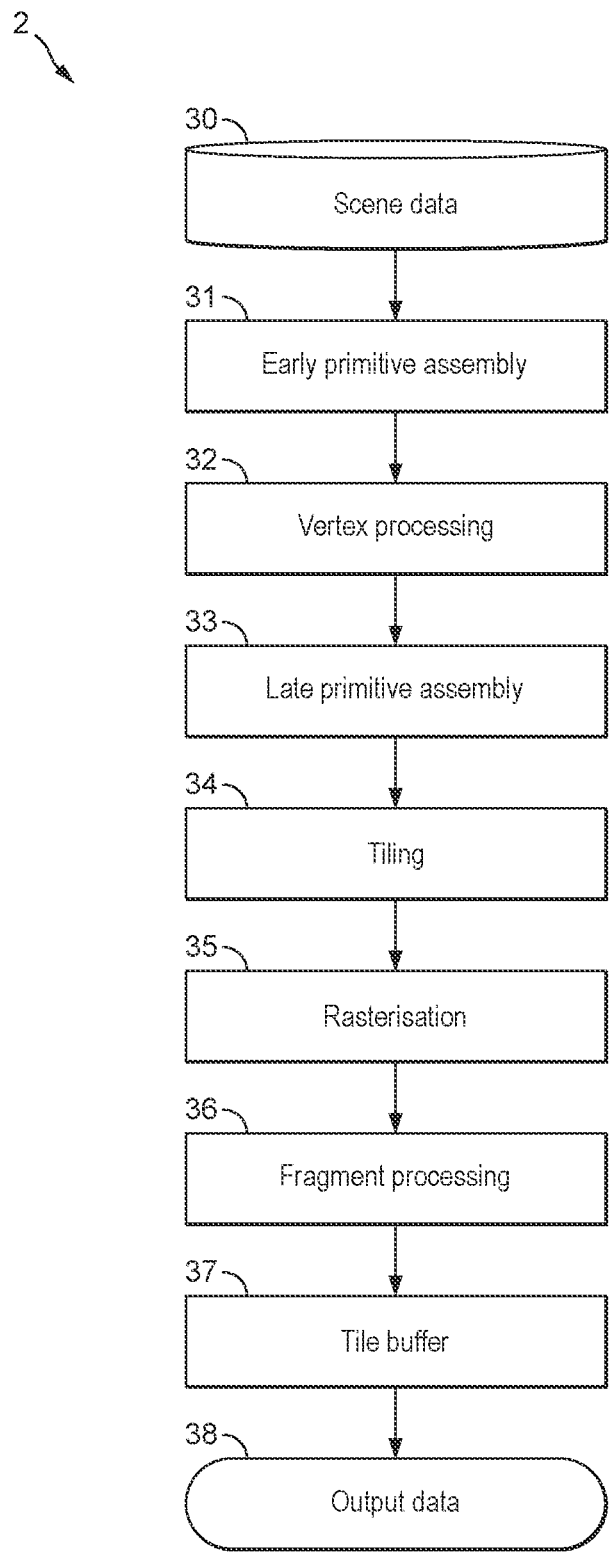
FIG. 3 shows schematically an embodiment of a graphics processor in accordance with the technology described herein.

FIG. 3 shows schematically the graphics processor 2 and the processing sequence of the graphics processing pipeline executed by the graphics processor 2 when generating an output in the present embodiments.

FIG. 3 shows the main elements and pipeline stages/circuits. As will be appreciated by those skilled in the art there may be other elements of the graphics processor and processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processor and processing pipeline as shown in FIG. 3 may, unless otherwise indicated, be implemented as desired and will accordingly comprise, e.g., appropriate circuitry, circuits and/or processing logic, etc., for performing the necessary operation and functions.

As shown in FIG. 3, again for an output to be generated, a set of scene data 30, including, inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

Then, in the present embodiment, an "early" primitive assembly stage (circuit) 31 operates to assemble primitives for processing using the provided set of indices referencing the vertices based on the provided primitive configuration information, to generate a sequence of assembled primitives, each primitive comprising at this stage an identifier for the primitive and a set of one or more vertex indices for the primitive. This operation will be discussed in more detail below.

The assembled primitives from the primitive assembly stage (circuit) 31 are then used to trigger the fetching and vertex processing (shading) 32 of attributes for the vertices for the assembled primitives. In the present embodiments the fetching of the vertex positions and the transforming of the positions for the vertices from the, e.g. "model" space in which they are initially defined, to the, e.g. "screen", space that the output image is being generated in is triggered and performed at this stage (but the fetching and shading of any other vertex attributes is triggered and performed at later stages of the graphics processing) Again, this operation will be discussed in more detail below.

There is then a "late" primitive assembly stage (circuit) 33 that assembles primitives for further processing from the sequence of primitives output by the early primitive assembly stage (circuit) 31 (and in particular using the indices for those primitives), by associating the primitives output by the early primitive assembly stage (circuit) 31 with the corresponding fetched and shaded vertex attributes from the vertex processing 32, to provide a sequence of assembled primitives, each primitive comprising an identifier for the primitive and the relevant fetched (and shaded) vertex attributes (positions) (and any other fetched data) for the vertices for the primitive. Again, this operation will be discussed in more detail below.

(Other vertex attributes (varyings), such as colours, transparency, etc., that are needed will be fetched (and as necessary "vertex shaded") later on in the pipeline, for example at the tiling stage (tiler).)

The assembled primitives with the fetched and processed vertex attributes (positions) from the late primitive assembly 32 are first passed to a tiler (tiling circuit) 34 for processing. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The tiler 34 performs the process of "tiling" to allocate the assembled primitives to primitive lists for respective render output regions (areas) which are then used to identify the primitives that should be rendered for each tile that is to be rendered to generate the output data (which may, e.g., be a frame to be rendered for display). For example, the tiler 34 may be implemented using a primitive list building unit which takes the assembled primitives as its input, builds primitive lists using that data, and stores the primitive lists in memory. The tiler may also cull certain primitives that are not visible.

The rasterisation stage (circuit) (rasteriser) 35 takes as its input the primitives (including their vertices), from the primitive list(s) for the tile being rendered, rasterises the primitive to fragments, and provides the fragments to a fragment processing stage (circuit) 36, which in this embodiment comprises a shader execution engine (a shader core). The shader execution engine is a programmable execution unit that performs fragment shading by executing fragment shading software routines (programs) for fragments received from the rasteriser 35.

Each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

Each fragment will be processed by means of one or more execution threads which will execute the instructions of the shader program in question for the fragment in question. Typically, there will be multiple execution threads each executing at the same time (in parallel).

The output of the fragment processing 36 (the rendered fragments) is written to a tile buffer 37. Once the processing for the tile in question has been completed, then the tile will be written to the output data array 38 in memory, and the next tile processed, and so on, until the complete output data array has been generated. The process will then move on to the next output data array (e.g. frame), and so on.

The output data array 38 may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 4:
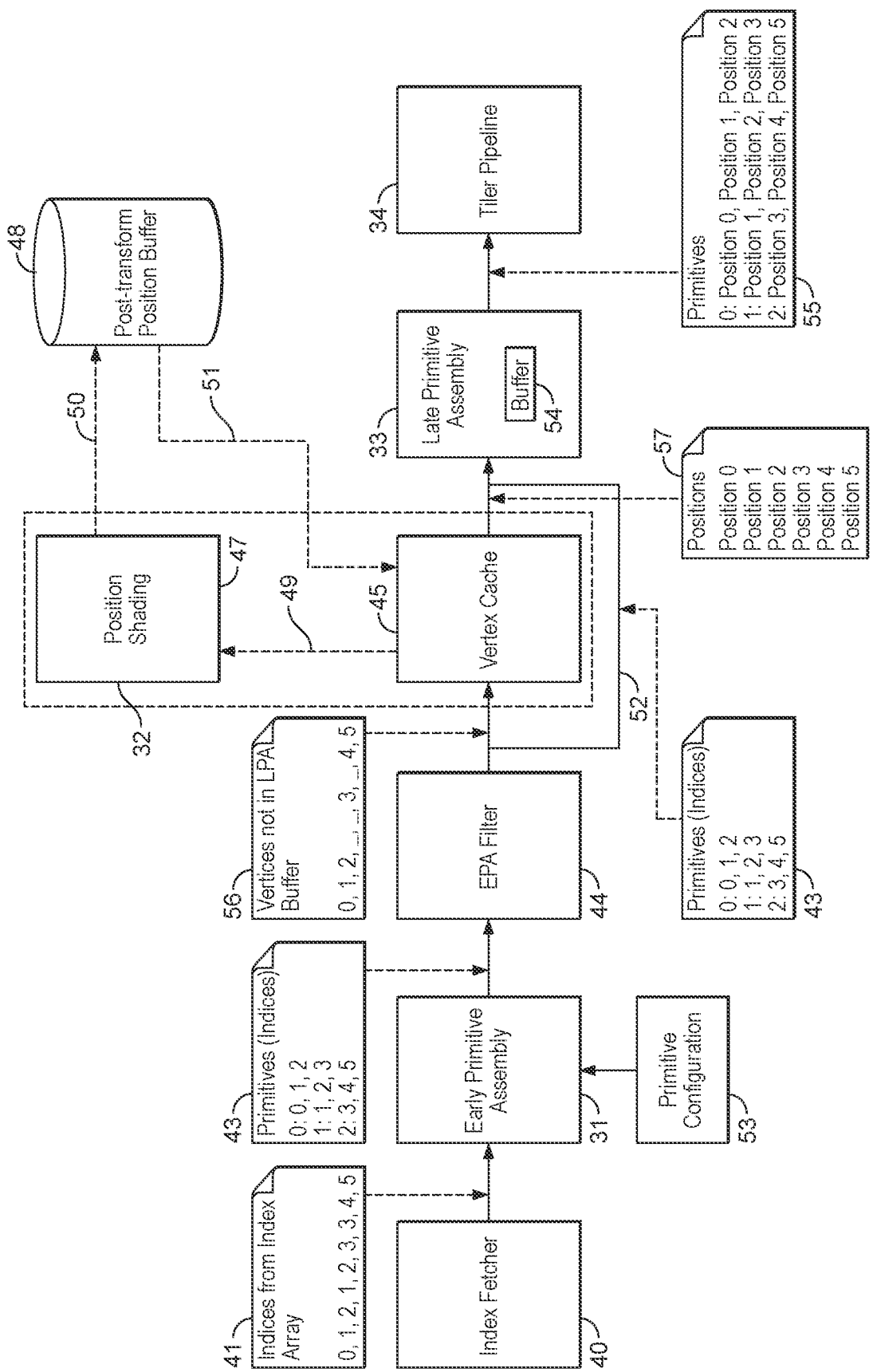
FIG. 4 shows certain parts of the operation of the graphics processor of FIG. 3 in more detail.

FIG. 4 shows the early primitive assembly stage (circuit) 31, vertex processing stage (circuit) 32 and late primitive assembly stage (circuit) 33 of the graphics processor 2 shown in FIG. 3 and their operation in more detail.

As shown in FIG. 4, the early primitive assembly process and circuit 31 includes an index fetcher (an index fetching circuit) 40 that fetches and outputs a sequence (stream) of indices 41 from the (stored) vertex index array defined and provided for the output being generated.

(As shown in FIG. 4, the same vertex index may appear more than once in the sequence of indices 41 for the output. It may also be the case that some vertices in the set of vertices for the output will not in fact be included in the sequence of indices for the output.)

The index fetcher 40 provides the sequence of indices 41 to the early primitive assembly stage (circuit) 31, which assembles complete primitives 43 from the stream of indices 41 provided by the index fetcher 40, in accordance with primitive configuration information 53 that defines the type of primitives to be assembled (e.g. whether the assembled primitives are to be in the form of triangles, triangle strips, triangle fans, points or lines, etc.). This primitive configuration information (primitive type definition) 53 may be provided, e.g., as part of a descriptor (metadata) for the output being generated.

The early primitive assembly stage (circuit) 31 is operable to output a sequence 43 of complete assembled primitives from the input stream of indices 41 according to the defined primitive type. At this stage, each (complete) primitive output by the early primitive assembly circuit 31 comprises an identifier for the primitive in the form of a sequence number for the primitive, and a sequence of vertex indices from the input index vertex stream, corresponding to the indices for the vertices to be used for the primitive.

In the present embodiment, the early primitive assembly circuit 31 is operable to discard any degenerate or incomplete primitives at this stage, such that only complete primitives (corresponding to the desired primitive type) will be output. The early primitive assembly circuit 31 may also be operable to subdivide more complex primitives into simpler primitives, such as triangles, lines or points, for output, if desired.

It should also be noted that at this stage, only the indices and the primitive configuration information provided to the early primitive assembly circuit (stage) will have been fetched from memory 31. At this point in the process, no vertex attributes have been fetched or processed (vertex shaded).

The sequence 43 of complete assembled primitives from the early primitive assembly stage (circuit) 31 are provided to an early primitive assembly filter stage (circuit) 44. The EPA filter 44 operates to determine (check) whether the positions for the vertices indicated by the indices for assembled primitives output by the early primitive assembly stage 31 are already stored in a late primitive assembly buffer 54 of the late primitive assembly stage (circuit) 33 or not.

As will be discussed further below, the late primitive assembly stage/circuit 33 acts as a "late" primitive assembly stage, that adds the transformed positions to the assembled primitives output by the early primitive assembly stage/circuit 31, and includes a buffer 54 that stores the transformed positions for a set of recently used vertices. The buffer 54 stores the transformed positions for (up to) a given number of different vertices according to a "recently used" protocol, such as on a first-in, first-out basis, or according to a least recently used replacement policy.

The EPA filter 44 maintains a record, such as a bit map, of those vertices (vertex indices) for which the appropriately transformed positions are already stored in the late primitive assembly buffer 54, and compares each vertex index of a new assembled primitive received from the early primitive assembly stage 31 to that record, to determine whether the transformed position for the vertex in question (indicated by the index) is already stored in the late primitive assembly buffer 54 or not.

For any index for an assembled primitive that the EPA filter 44 determines is not currently stored in the late primitive assembly buffer 54, the EPA filter 44 forwards the index to the vertex processing stage (circuit) 32, for the desired vertex attributes (in the present embodiments the position (position attribute(s)) for the vertex to be fetched (and any necessary vertex processing (vertex shading) of the attribute (in this case the position) to be performed.

As shown in FIG. 4, in the present embodiment the vertex fetching/processing stage (circuit) 32 comprises a vertex cache 45 and a vertex shading (in this case a position shading) stage/circuit 47.

The vertex cache 45 stores appropriately transformed positions (position attributes) 51 for a plurality of vertices, from where they can then be read into the late primitive assembly buffer 54 for using for the late primitive assembly process 33 (this will be discussed in more detail below).

The vertex cache 45 is also operable to trigger any necessary vertex processing (vertex shading for a vertex being fetched), which in this case, as shown in FIG. 4, will comprise position shading of the positions (position attribute(s)) for the vertices, by means of a position shader 47 to generate the appropriately transformed positions.

The position shading process (position shader) 47 executes appropriate position shading programs for the positions (position attributes) of vertices, to transform the positions from their "model" space definitions to the appropriate "screen" space that the output is being generated with respect to.

The shaded (transformed) positions are then stored 50 in a post-transform position buffer 48 from where they can then be fetched 51 by the vertex cache 45.

Each vertex will be processed (position shaded) by means of one or more execution threads which will execute the instructions of the (position) shader program in question for the vertex in question. Typically, there will be multiple execution threads each executing at the same time (in parallel).

The position shading process (position shader) 47 executes the position shading programs on a respective programmable processing core (shader core) or cores of the graphics processor 2.

As well as generating the appropriately transformed positions for the vertices, the position shading may also generate other parameters, such as one or more of: variable rate shading parameter values, a point size, line width, and/or a layer ID, etc., if desired. In this case, these additional parameters are in an embodiment also stored with the transformed positions in the post transform position buffer 48 and fetched therefrom into the vertex cache 45.

The EPA filter 44 checks each index for each complete primitive that it receives from the early primitive assembly 31 to determine whether the transformed position attributes for the vertex are already stored in the buffer 54 of the late primitive assembly stage (circuit) 33 or not.

Thus, as shown in Figure, the EPA filter 44 forwards any index 56 for an assembled primitive that the EPA filter 44 determines is not already stored in the late primitive assembly buffer 54 to the vertex cache 45 of the vertex fetching/processing stage (circuit) 32 to perform a lookup for that index (the vertex that the index corresponds to) in the vertex cache 45.

When the EPA filter 44 forwards an index for a vertex that is not already stored in the late primitive assembly stage buffer 54 to the vertex cache 45, a lookup for that index is performed in the vertex cache 45, and if the vertex is not present (and not already being fetched) (i.e. there is a cache miss for the vertex), then the vertex cache 45 (the cache controller) sends a position shading request 49 for the vertex in question (indicated by the index) to the position shader 47 to trigger the position shading for the vertex in question.

Then, once the position shading has been performed, the shaded (transformed) position 50 for the vertex in question is stored in the post-transformed position buffer 48. The vertex cache 45 then fetches 51 the transformed position for the vertex in question from the post-transform position buffer 48. At this point, the relevant transformed position for the vertex in question will be present in the vertex cache 45, and so can be fetched therefrom into the buffer 54 of the late primitive assembly stage/circuit 33.

For any vertex (index) that the EPA filter 44 determines is already present in the late primitive assembly buffer 54 (i.e. the late primitive assembly stage/circuit 33 already stores the transformed positions for the vertex in question), then the index is not sent to (looked up in) the vertex cache 45.

In this way, the position shading and loading of the transformed positions into the vertex cache 45 is only triggered for those vertices for which the transformed positions are not already stored by the late primitive assembly stage/circuit 33.

Thus, as shown schematically in FIG. 4, on the assumption that the late primitive assembly stage (circuit) 33 will already store the transformed positions for vertices 1 and 2 from the first primitive in the exemplary sequence illustrated in FIG. 4, as shown in FIG. 4, the indices for those vertices will not be sent again (will not be looked up again) in the vertex cache 45 when those vertices reoccur in the second primitive in the sequence (and similarly for vertex index "3").

The EPA filter 44 also sends 52, as shown in FIG. 4, the sequence of assembled primitives 43 received from the early primitive assembly 31 to the late primitive assembly stage/circuit 33.

The late primitive assembly stage/circuit 33 associates each primitive in the sequence 43 with the corresponding transformed positions 57 for the vertices for the primitive in question, and accordingly outputs a corresponding sequence 55 of assembled primitives, which primitives, at this stage, as shown in FIG. 4, now each comprise the primitive identifier and a sequence of shaded (transformed) positions for the primitives in the sequence. The so-assembled primitives are then sent to the tiler 34 for tiling (and subsequently rasterising and rendering, as discussed above with reference to FIG. 3).

(It should be noted here that although FIG. 4. only shows a few primitives, vertices, indices, positions, etc., for clarity purposes, the number of primitives, vertices, indices, for a given output may be, and typically will be, significantly higher.)

FIG. 5 shows elements of the vertex cache 45 and late primitive assembly circuit (stage) 33 shown in FIG. 4 in more detail.

As shown in FIG. 5, the vertex cache 45 stores sets of vertices (vertex attributes) 60 in respective cache lines 61, in this case as respective sets of (shaded) positions and of other attributes for the vertices.

As shown in FIG. 5, the vertex cache 45 includes a vertex loader circuit 62 that will fetch the vertices (the vertex attributes) from where they are stored and load them into the vertex cache 45, together with a vertex output circuit 63 for outputting vertices from the cache to the late primitive assembly circuit (stage) 33. There may also be a delay FIFO 64, for example, for hiding any latency between (starting) the loading of the vertices and the vertices being ready for output.

FIG. 5 also shows the late primitive assembly circuit 33 in more detail. As shown in FIG. 5, the late primitive assembly circuit 33 will include appropriate primitive assembly logic 65 that is operable to output complete primitives including a primitive ID together with the appropriate (shaded) vertex attributes to, in this case, the tiler pipeline, based on a sequence of assembled primitives 52 received from the early primitive assembly 31 and (shaded) vertices that are fetched from the vertex cache 45 and/or from the recently used vertex buffer 54 (which as shown in FIG. 5, stores a set of recently used vertices, including the relevant (shaded) attributes, such as position and other attributes, for those vertices along with a corresponding vertex ID. (In the case where the late primitive assembly logic 65 requires a vertex from the vertex cache for a primitive, it will also store that vertex appropriately in the buffer 54 for future use.)

In an embodiment, the graphics processor is able to suspend and then resume the primitive assembly operation for a given output being generated. In this case, when suspending the primitive assembly operation, the primitive (sequence) number of the last primitive that was fully processed for the output is recorded, and then when resuming the processing for the output in question, the early primitive assembly process for the output is re-started from the beginning, but the primitives output by the (early) primitive assembly process (circuit) are all discarded, until the primitive immediately following the last primitive that was fully processed is reached.

In order to further support increased primitive throughput, the (early) primitive assembly stage (process) may be operable to detect pairs of primitives with shared edges, and to output such primitive pairs with a shared edge as a single, complete, assembled primitive for processing.

In an embodiment, in order to support multi-view operation (i.e. where the same scene is to be rendered from multiple view points), the generation of the (additional) vertices required for each view of a multi-view output is done by the EPA filter 44, by that filter triggering the generation and position shading of the vertices required for the additional primitives for the additional views, by performing the appropriate lookups into the vertex cache 32 to trigger the generation and position shading of the additional vertices.

As will be appreciated by those skilled in the art, the technology described herein, in its embodiments at least, can provide a more efficient graphics processing pipeline, in particular with respect to the primitive assembly process. This is achieved, in the embodiments of the technology described herein at least, by assembling primitives based on the sequence of indices indicated for an output before any vertex attributes for the primitives are fetched and processed, and only triggering the vertex attribute fetching process after the primitives have been assembled from the indices.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

before fetching any vertex attributes for vertices of the set of vertices to be used for primitives to be processed when generating the output, assembling a sequence of one or more of primitives to be processed when generating the output from the set of vertex indices provided for the output based on the primitive configuration information provided for the output, and discarding any incomplete or degenerate primitives, such that the sequence of assembled primitives comprises complete primitives only, each assembled primitive of the sequence of assembled primitives comprising an identifier for the primitive and a set of one or more vertex indices for the primitive;

after primitives have been assembled, fetching from memory one or more attributes for vertices of the assembled primitives in the sequence of assembled primitives based on vertex indices of the complete primitives in the sequence of assembled primitives, the fetching one or more attributes for vertices of the assembled primitives in the sequence of assembled primitives based on vertex indices of the complete primitives in the sequence of assembled primitives including performing vertex attribute processing for one or more of the attributes being fetched, whereby only the vertex attributes for vertices of complete primitives to be processed are fetched from memory and subjected to vertex attribute processing and after the primitives have been assembled; and providing the assembled primitives including their fetched vertex attribute(s) to later stages of the graphics processing pipeline that is being executed by the graphics processor for processing.

2. The method of claim 1, comprising fetching only the position for vertices of the assembled primitives based on vertex indices of the assembled primitives, and providing the assembled primitives including their fetched positions to later stages of the graphics processing pipeline for processing.

3. The method of claim 1, wherein:
fetching one or more attributes for vertices of the assembled primitives based on vertex indices of the assembled primitives comprises fetching the positions for vertices of the assembled primitives based on vertex indices of the assembled primitives; and
fetching the position for a vertex of an assembled primitive comprises transforming the position from the space it is initially defined in to the space for the output being generated and fetching the transformed position for the vertex.

4. The method of claim 1, further comprising:
storing a set of recently used fetched vertex attributes for use when providing the assembled primitives including their fetched vertex attribute(s) to later stages of the graphics processing pipeline that is being executed by the graphics processor for processing;
and wherein the step of fetching one or more attributes for vertices of the assembled primitives based on vertex indices of the assembled primitives comprises:
first determining whether the attribute or attributes to be fetched for a vertex are already stored in the stored set of recently used fetched vertex attributes; and
when it is determined that the attribute or attributes to be fetched for a vertex are already stored in the stored set of recently used fetched vertex attributes, not triggering fetching of the attribute or attributes for the vertex; and
when it is not determined that the attribute or attributes to be fetched for a vertex are already stored in the stored set of recently used fetched vertex attributes, triggering fetching of the attribute or attributes for the vertex.

5. The method of claim 1, wherein the graphics processor is a tile based graphics processor, and the assembled primitives including their fetched vertex attribute(s) are first provided to the tiling process of the graphics processing pipeline that the graphics processor is executing.

6. The method of claim 1, wherein the graphics processor is operable to be able to suspend and then resume the primitive assembly operation for an output being generated, and the method further comprises:
when suspending the primitive assembly operation, recording the primitive sequence number of the last primitive that was assembled for the output; and
then when resuming the processing for the output, restarting the primitive assembly process for the output from the beginning, but discarding the primitives output by the primitive assembly process without fetching any vertex attributes for those primitives, until the primitive immediately following the last primitive that was assembled is reached.

7. A graphics processor operable to execute a graphics processing pipeline to generate an output, the graphics processor comprising:
a primitive assembly circuit configured to, before any vertex attributes for vertices of a set of vertices to be used for primitives to be processed when generating the output have been fetched, generate a sequence of one or more of primitives to be processed when generating an output from a set of vertex indices provided for the output, the set of vertex indices referencing vertices in a set of vertices provided for the output, each vertex having associated with it a set of one or more vertex attributes, based on primitive configuration information provided for the output, the primitive configuration information indicating how the vertex indices are to be assembled into primitives for processing when generating the output, the primitive assembly circuit further configured to discard any incomplete or degenerate primitives, such that it outputs a sequence of assembled primitives comprising complete primitives only, each complete assembled primitive of the sequence of assembled primitives comprising an identifier for the primitive and a set of one or more vertex indices for the primitive;
a vertex fetching circuit configured to, after primitives have been assembled by the primitive assembly circuit, fetch from memory one or more attributes for vertices of the assembled primitives in the sequence of assembled primitives based on vertex indices of the complete primitives in the sequence of assembled primitives, wherein the vertex fetching circuit is configured to trigger vertex attribute processing for one or more of the attributes being fetched, whereby only the vertex attributes for complete primitives to be processed are fetched from memory and subjected to vertex attribute processing and after the primitives have been assembled; and
a processing circuit configured to provide the assembled primitives including their fetched vertex attribute(s) to later stages of the graphics processing pipeline that the graphics processor executes for processing.

8. The graphics processor of claim 7, wherein the vertex fetching circuit is configured to fetch only the position for vertices of the assembled primitives based on vertex indices of the assembled primitives.

9. The graphics processor of claim 7, wherein the vertex fetching circuit comprises a vertex cache that stores fetched vertex attributes, and indices for primitives output by the primitive assembly circuit are looked up in the vertex cache and when there is a cache miss, the fetching of the relevant attribute for the vertex into the vertex cache is triggered.

10. The graphics processor of claim 7, wherein the processing circuit configured to provide the assembled primitives including their fetched vertex attribute(s) to later stages of the graphics processing pipeline that the graphics processor executes for processing comprises:
  a further primitive assembly circuit configured to receive as inputs the sequence of assembled primitives comprising an identifier and a set of one or more vertex indices for each primitive output by the primitive assembly circuit, and the fetched vertex attributes from the vertex fetching circuit, and to output, based on and using those inputs, a sequence of assembled primitives including, for each primitive, one or more fetched vertex attributes for the vertices for the primitive.

11. The graphics processor of claim 7, wherein the processing circuit configured to provide the assembled primitives including their fetched vertex attribute(s) to later stages of the graphics processing pipeline that the graphics processor executes for processing is configured to store a set of recently used fetched vertex attributes for use when providing the assembled primitives including their fetched vertex attribute(s) to later stages of the graphics processing pipeline that is being executed by the graphics processor for processing.

12. The graphics processor of claim 11, further comprising:
  a vertex index checking circuit configured to check for an index for a vertex for an assembled primitive output by the primitive assembly circuit, whether an attribute or attributes for the vertex is already stored by the processing circuit configured to provide the assembled primitives including their fetched vertex attribute(s) to later stages of the graphics processing pipeline that the graphics processor executes for processing.

13. The graphics processor of claim 12, wherein the vertex index checking circuit is configured to:
  when it is other than determined that an attribute or attributes for a vertex is already stored by the processing circuit configured to provide the assembled primitives including their fetched vertex attribute(s) to later stages of the graphics processing pipeline that the graphics processor executes for processing, provide the index for the vertex to the vertex fetching circuit for the fetching of one or more attributes for the vertex to be triggered; and
  when it is determined that an attribute or attributes for the vertex is already stored by the processing circuit configured to provide the assembled primitives including their fetched vertex attribute(s) to later stages of the graphics processing pipeline that the graphics processor executes for processing, provide the index for the vertex to the processing circuit configured to provide the assembled primitives including their fetched vertex attribute(s) to later stages of the graphics processing pipeline, without providing the index for the vertex to the vertex fetching circuit.

14. The graphics processor of claim 12, wherein the vertex index checking circuit is configured to, when the graphics processor is generating a multi-view output, trigger the generation of the additional vertices for the additional primitives required for generating the multi-view output from the sequence of primitives received from the primitive assembly circuit.

15. The graphics processor of claim 7, wherein the graphics processor is a tile based graphics processor and includes a tiling circuit configured to prepare primitive lists for regions of an output to be generated, and the processing circuit configured to provide the assembled primitives including their fetched vertex attribute(s) to later stages of the graphics processing pipeline that the graphics processor executes for processing is configured to provide the assembled primitives including their fetched vertex attribute(s) to the tiling circuit.

16. The graphics processor of claim 7, wherein the graphics processor is operable to be able to suspend and then resume the primitive assembly operation for an output being generated, and the graphics processor is configured to:
  when suspending the primitive assembly operation, record the primitive sequence number of the last primitive that was assembled for the output; and
  then when resuming the processing for the output, re-start the primitive assembly process for the output from the beginning, but discard the primitives output by the primitive assembly process without fetching any vertex attributes for those primitives, until the primitive immediately following the last primitive that was assembled is reached.

17. A non-transitory computer readable storage medium comprising computer software code which when executing on at least one processor performs a method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:
  before fetching any vertex attributes for vertices of the set of vertices to be used for primitives to be processed when generating the output, assembling a sequence of one or more of primitives to be processed when generating the output from the set of vertex indices provided for the output based on the primitive configuration information provided for the output, and discarding any incomplete or degenerate primitives, such that the sequence of assembled primitives comprises complete primitives only, each assembled primitive of the sequence of assembled primitives comprising an identifier for the primitive and a set of one or more vertex indices for the primitive;
  after primitives have been assembled, fetching from memory one or more attributes for vertices of the assembled primitives in the sequence of assembled primitives based on vertex indices of the complete primitives in the sequence of assembled primitives, the fetching one or more attributes for vertices of the assembled primitives in the sequence of assembled primitives based on vertex indices of the complete primitives in the sequence of assembled primitives including performing vertex attribute processing for one or more of the attributes being fetched, whereby only the vertex attributes for complete primitives to be processed are fetched from memory and subjected to vertex attribute processing and after the primitives have been assembled; and
  providing the assembled primitives including their fetched vertex attribute(s) to later stages of the graphics processing pipeline that is being executed by the graphics processor for processing.

* * * * *